UNITED STATES PATENT OFFICE.

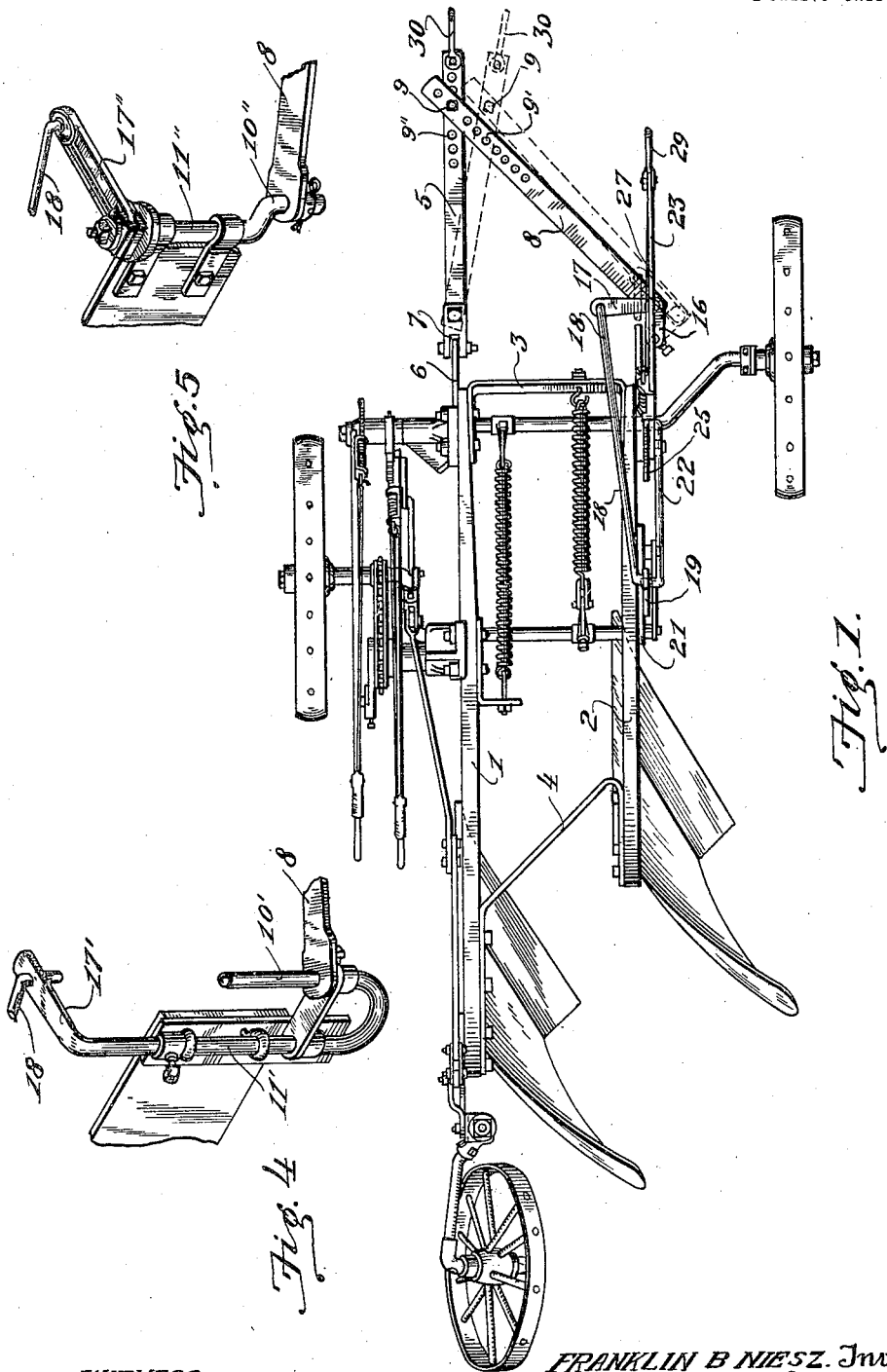

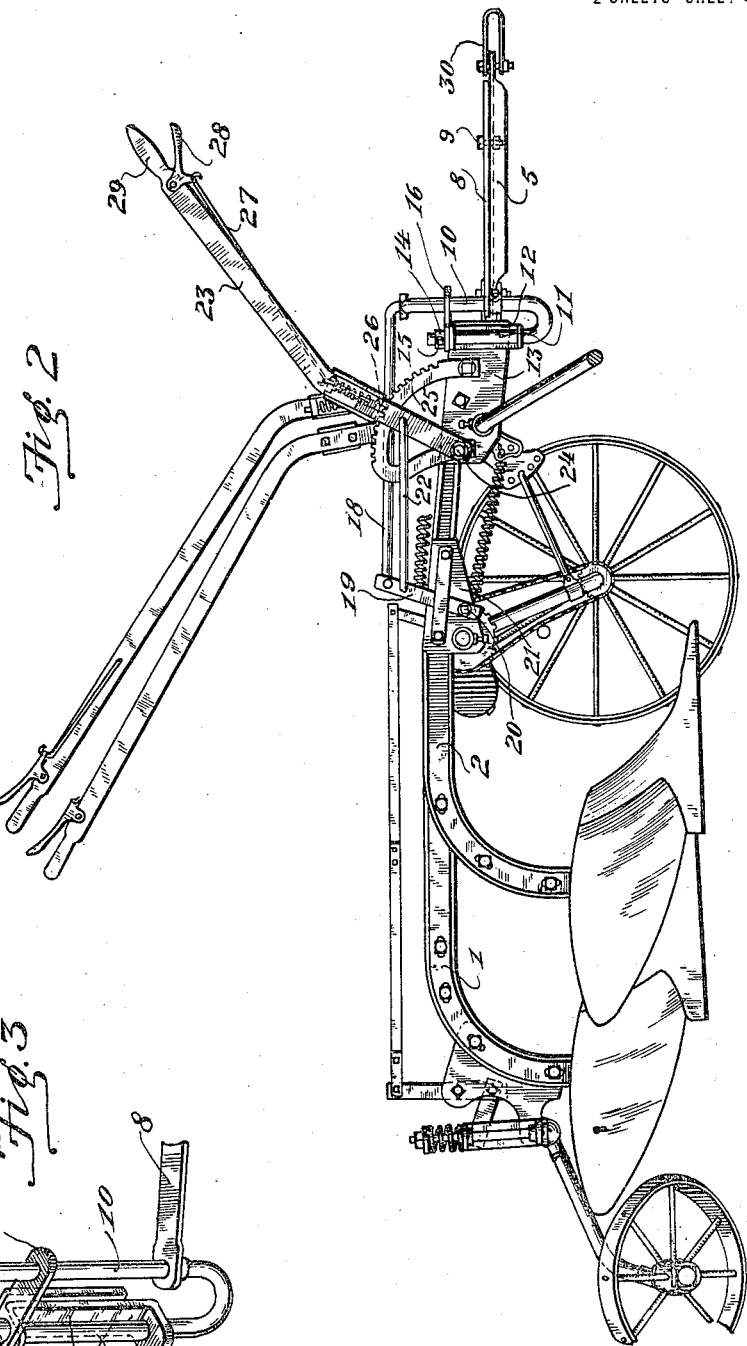

FRANKLIN B. NIESZ, OF CANTON, OHIO, ASSIGNOR TO THE BUCHER AND GIBBS PLOW COMPANY, A CORPORATION OF OHIO.

GANG-PLOW.

1,380,581.  Specification of Letters Patent.  Patented June 7, 1921.

Application filed August 27, 1917. Serial No. 188,400.

*To all whom it may concern:*

Be it known that I, FRANKLIN B. NIESZ, a citizen of the United States, residing at Canton, in the county of Stark and State of Ohio, have invented a new and useful Improvement in Gang-Plows, of which the following is a specification.

The invention relates to the draft bar of a gang plow; and the object of the improvement is to provide means for readily and conveniently varying the line of draft to compensate for the tendency of the plow to drag downwardly upon laterally inclined ground.

When the draft bar is adjusted for a direct pull on laterally level ground, and the plow is drawn along the side of a hill, the downward drag of the plow causes it to diverge from the proper line of the furrow, which tendency can, however, be overcome by a lateral adjustment of the draft bar with reference to the frame of the plow.

Draft bars are frequently pivotally connected to one of the forward corners of the frame of the plow and are held against lateral movement by a diagonal brace pivoted at its rear end to the other forward corner of the frame; and such a draft bar is laterally adjusted by varying the point of connection between the bar and the brace. But such an adjustment when once made is relatively fixed, and requires the removal and replacement of the connecting bolt to vary the line of draft, and cannot be readily or conveniently resorted to when the plow passes from level ground to a hill side, or when the plow is reversed from one direction to another along the same hill side.

A preferred embodiment of the present invention contemplates the use of such a draft bar and such a brace, and the object of the improvement is attained by connecting the rear end of the brace to the corresponding corner of the plow frame by means of a laterally movable pivot which may be swung or oscillated from one position to another by means of an operating lever, for varying the relative position of the draft bar with reference to the frame of the machine.

Such an embodiment of the invention is illustrated in the accompanying drawings forming part hereof, in which—

Figure 1 is a plan view of a gang plow provided with the improved draft bar;

Fig. 2, is a side elevation of the same with the furrow wheel omitted;

Fig. 3, a detached perspective view of one form of swinging pivot;

Fig. 4, a fragmentary perspective view of a modified form of swinging pivot; and Fig. 5, a fragmentary perspective view of another form of swinging pivot.

Similar numerals refer to similar parts throughout the drawings.

The main beam 1 and the side beam 2 of the gang plow are connected together at the forward and rear ends by the cross bars 3 and 4, and the plow frame thus formed is usually made rectangular at its forward end.

The draft bar 5 is pivotally connected to the forward end of the main beam by means of the extension plate 6 secured thereto and the clevis 7, which clevis is transversely pivoted to the extension plate and vertically pivoted to the draft bar, thus forming a universal joint for the draft bar.

The diagonal brace bar 8 is detachably connected at its forward end to the draft bar by means of the bolt 9, and each bar is provided with a series of apertures 9' and 9" by means of which this connection may be varied by the use of any one aperture of one bar with any one aperture of the other bar for receiving the connecting bolt.

The rear end of the brace bar 8 is journaled on the upright pivot 10, 10' or 10", which is mounted upon the forward end of the side bar 2 of the plow frame, and is adapted to swing or oscillate laterally, as a crank upon an adjacent axis, for swinging the forward end of the draft bar to one side or the other, the connecting bolt 9 between the draft bar and the brace bar serving as a pivotal connection for permitting the lateral movement of the draft bar.

As shown in Figs. 1, 2 and 3, the swinging pivot 10 may constitute one leg of a U-shaped bar, the other leg 11 of which is uprightly journaled in the bearing bracket 12 secured by the extension plate 13 to the forward end of the side beam 2; and when this form of swinging pivot is used, the vertical leg 11 of the U-shaped bar is preferably entered into the bearing bracket from below and is supported therein by means of the collar 14 and the set screw 15, and the link 16 resting upon the upper end of the bearing bracket 12 may be employed for connecting and bracing the upper ends of the U-shaped bar together.

The laterally extending crank arm 17 is formed or secured on one leg of the U-shaped bar, and as shown is bent laterally from the upper end of the swinging pivot 10, to which crank arm is pivoted the forward end of the connecting bar 18 which is pivoted at its rear end to the lever 19 fulcrumed at 20 to the plate 21 secured to the side beam 2 of the plow frame; to which lever is pivotally connected the rear end of the connecting bar 22 having its forward end pivotally connected to the operating lever 23 which may be fulcrumed at 24 to the extension plate 13 at the forward end of the side beam.

The operating lever may be releasably stopped in a given position by means of the rack segment 25 mounted on the extension plate 13 and the spring detent 26 mounted on the operating lever, which detent may be released from the rack by means of the connecting link 27 and the hand lever 28 fulcrumed on the handle 29 of the operating lever 23.

As shown in Fig. 4, the crank arm 17' may be bent from the upper end of the pivotal leg 11' of a U-shaped bar; and as shown in Fig. 5, the swinging pivot 10'' may be in the form of a crank on the end of a rock shaft 11'' having a crank arm 17'' on its other end; and in both cases a swinging pivot 10' or 10'' may be oscillated by means of the operating lever 23 and the intervening connections as described above.

When the gang plow is worked on level ground, the draft bar 5 is adjusted by means of the pivot bolt 9 and the apertures 9' and 9'' in the bar and brace, so that the tractor or other power which may be connected to the clevis 30 on the forward end of the draft bar will draw the plow directly forward in a line parallel with the furrow; and in this relation of the parts, the draft bar may be and is usually located in a longitudinal position with reference to the frame of the plow; and it is evident that when the plow is drawn from level to laterally inclined ground, as for instance when it is being worked along a hill side, it is only necessary to swing the oscillating pivot carrying the rear end of the brace 8, in one direction or another by means of the operating lever 23, which oscillation swings the forward end of the draft bar 5 laterally one way or the other, as shown one way by broken lines in Fig. 1, thus changing the line of draft and compensating for the tendency of the plow to drag downward upon the hill side. And in event the movement of the plow shall be reversed along the same hill side, it is only necessary to swing the forward end of the draft bar in the opposite direction by a suitable manipulation of the operating lever to properly adjust the draft of the plow.

I claim:

In combination with the frame of a gang plow, a draft bar pivotally connected to the frame, a rock shaft having a crank arm and being pivoted to the frame at a lateral interval from the draft bar connection, a diagonal brace bar pivotally connected at its forward end to the draft bar and at its rear end to the crank arm, and means for adjusting the rock shaft and to swing the crank arm to vary the angle of the draft bar.

FRANKLIN B. NIESZ.